US006348924B1

(12) United States Patent
Brinsmead

(10) Patent No.: US 6,348,924 B1
(45) Date of Patent: Feb. 19, 2002

(54) METHOD AND APPARATUS FOR INTERACTIVELY PAINTING VOLUMETRIC PARTICLE FLOW PATHS AND CONTROLLING A FLOW OF THE FLOW PATHS

(75) Inventor: Duncan Richard Brinsmead, Toronto (CA)

(73) Assignee: Silicon Graphics, Inc., Mountain View, CA (US)

(*) Notice: Subject to any disclaimer, the term of this patent is extended or adjusted under 35 U.S.C. 154(b) by 0 days.

(21) Appl. No.: 09/265,433

(22) Filed: Mar. 10, 1999

(51) Int. Cl.[7] .............................................. G06T 11/20
(52) U.S. Cl. ...................... 345/441; 345/473; 345/582
(58) Field of Search ................................. 345/429, 441, 345/473, 430, 582

(56) References Cited

U.S. PATENT DOCUMENTS

| | | | | |
|---|---|---|---|---|
| 5,404,426 A | | 4/1995 | Usami et al. ................ | 395/120 |
| 5,500,925 A | | 3/1996 | Tolson ......................... | 395/131 |
| 5,673,377 A | * | 9/1997 | Berkaloff ..................... | 345/430 |
| 5,687,304 A | * | 11/1997 | Kiss ............................. | 345/419 |
| 5,764,233 A | | 6/1998 | Brinsmead et al. .......... | 345/419 |
| 5,777,619 A | | 7/1998 | Brinsmead ................... | 345/419 |
| 5,831,633 A | * | 11/1998 | Van Roy ..................... | 345/441 |
| 6,014,151 A | * | 1/2000 | Cohen et al. ................ | 345/474 |
| 6,067,094 A | * | 5/2000 | Schuster ...................... | 345/441 |
| 6,137,500 A | * | 10/2000 | Silverbrook et al. ........ | 345/442 |

OTHER PUBLICATIONS

Pat Hanrahan et al., Direct WYSIWYG Painting and Texturing on 3D Shapes, Computer Graphics, vol. 24, No. 4, pp. 215–223, Aug., 1990.
Karl Sims, Particle Animation and Rendering Using Data Parallel Computation, Computer Graphics, vol. 24, No. 4, pp. 405–413, Aug., 1990.
Ken–ichi Anjyo et al., A Simple Method for Extracting the Natural Beauty of Hair, Computer Graphics, vol. 26, No. 2, pp. 111–120, Jul., 1992.
Yasuhiko Watanabe et al., A Trigonal Prism–Based Method for Hair Image Generation, IEEE Computer Graphics & Applications, pp. 47–53, Jan., 1992.
Robert E. Rosenblum et al., Simulating the Structure and Dynamics of Human Hair: Modelling, Rendering and Animation, The Journal of Visualization and Computer Animation, vol. 2, pp. 141–145, Jun., 1991.
André M. LeBlanc et al., Rendering Hair using Pixel Blending and Shadow Buffers, The Journal of Visualization and Computer Animation, vol. 2., No. 3, pp. 96–110, 1991.
William T. Reeves et al., Particle Systems—A Technique for Modeling a Class of Fuzzy Objects, ACM Transactions on Graphics, vol. 2, No. 2, pp. 91–108, Apr., 1983.
Meier, Barbara J., "*Painterly Rendering for Animation*", Computer Graphics Proceedings, Annual Conference Series, 1996, pp. 477–484.
Robertson, Barbara, "*Deep Background*", Computer Graphics World, Jul., 1999, pp. 50–51.
Edgar Rice Burroughs, Inc., "*TARZAN®*", 1999. pp. 1–2.

* cited by examiner

*Primary Examiner*—Jeffery Brier
*Assistant Examiner*—Motilewa Good-Johnson
(74) *Attorney, Agent, or Firm*—Staas & Halsey LLP

(57) ABSTRACT

A system that allows a user to interactively paint volumetric particles using a brush stroke. The particles are emitted from an area around the stroke path as the stroke is being made. As each stroke input event occurs, the system emits new particles from the new stroke segment and adds a segment to the particles that have already been emitted. This allows the user to interact with the particles as they are being "grown" and change a direction of a stroke thereby affecting the final image. As the particles are growing they can be affected by forces and displacements which change the position of the volumetric particle segments. The user can set or designate the stroke itself as a force which allows the user to control the flow of the generated particles.

22 Claims, 8 Drawing Sheets

METHOD AND APPARATUS FOR INTERACTIVELY PAINTING VOLUMETRIC PARTICLE FLOW PATHS AND CONTROLLING A FLOW OF THE FLOW PATHS

BACKGROUND OF THE INVENTION

1. Field of the Invention

The present invention is directed to a system for painting volumetric particle flow paths interactively and, more particularly, to allowing a user to interactively control the flow of volumetric particles or tubes around or on a geometry surface.

2. Description of the Related Art

Today there is a need to allow 3D graphics artists to paint realistic hair, grass, fire, smoke, water. fur, trees, etc. In such painting the flow of "elements" is important to the final image. Conventionally, a user has been allowed to set or place "forces" in a 3D geometric scene and then run a batch simulation that generates particles. A display of the results is provided at the end of the simulation or at periodic intervals during the simulation. The control of this batch process is not interactive such that the user is not allowed to change the simulation as it is running. The user just gets what has been programmed. Because there is considerable delay between the setting of the forces and the production of the display, the production of images using these conventional techniques is not intuitive. Such conventional systems do allow the user to set the starting position of the simulation.

What is needed is a system that will allow a user to interactively "paint" where particles are to start in association with a geometry and to "paint" the forces on the particles or how the particles behave from the start to the finish of the simulation.

SUMMARY OF THE INVENTION

It is an object of the present invention to allow a user to paint particle flows onto and around geometries (for example, volumes) or onto mathematical constructs.

It is another object of the present invention to allow a user to paint the forces that act on particle flows as they are painted.

It is an object of the present invention to provide a system that interactively paints volumetric particles and interactively controls the flow of the particles.

It is an additional object of the present invention to display the particle interactively providing the user with immediate feedback.

It is also an object of the present invention to allow a user to paint the particles from any/multiple points of view.

It is a further object of the present invention to allow the user to control the flow (velocity, direction, etc.) of particles after they are produced via user inputs including the pointed paths, control points and control curves.

It is still another object of the present invention to reduce the need for memory during particle production by producing particles as they are needed and only while they are needed.

The above objects can be attained by a system that allows a user to paint volumetric particles or particle tubes using a brush stroke. The particles are emitted from an area around the stroke path as the stroke is being made, allowing the user to interact with the particle tubes being grown and change a direction of a stroke thereby affecting the final image. The system also allows the user to set or designate the stroke itself as a force which attracts or repels the particle tubes as they are generated, allowing the user to control the flow of the generated particles.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
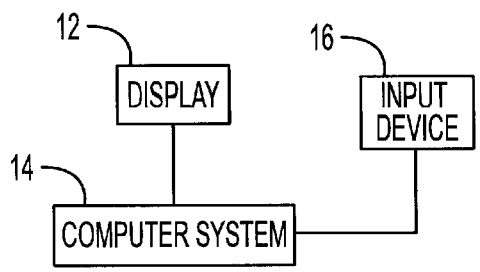
FIG. 1 illustrates the hardware components of a system of the present invention.

The present invention provides the ability to paint volumetric particles (or particle tubes) on and around a geometry interactively, allowing the user to get immediate feedback on what the painted object will look like. During operation a surface of an object is displayed on a computer display 12 of a graphics capable computer system 14, such as the Octane™ system available from Silicon Graphics, Inc., as depicted in FIG. 1. The user, using an input device 16, such as a mouse or digitizer pad and stylus, selects a surface of an the object (or a plane), sets it as paintable, selects a brush tool (size, shape, etc.) and drags it across the surface or through the 3D scene in a stroke producing a paint or stroke path. The path is either painted as the path is being drawn or an area around the path "sprouts" volumetric particles which can grow into designated features such as grass, hair, trees, fire, etc. These volumetric particles appear and grow as the stroke continues in the scene or on the surface. The points at which particles start within the area of the path are determined at random. The volumetric particles grow in segments as the path is painted, based on stroke input events, with each particle having a set life span or maximum number of segments. As the path is drawn the system of the present invention periodically samples points on the path. Each time a sample occurs, new particles are started and existing particles grow another segment unless the maximum segment length has been reached. The user can specify that volumetric particles only grow as long as the stroke continues or that they grow until their maximum length is reached.

The direction of growth, speed of growth, etc. can be controlled by forces and displacements applied to the particles as they grow. A displacement is applied after a segment of the particle is projected but before it is painted and moves the segment into a new position. A force is applied to a particle while it is growing such that a small cumulative force can affect the entire particle in a systematic way. The current position of the paint tool or brush can be used as the location of an attractive or repellant force or a path follow force allowing the user's stroke to control the flow of the particles as and after they are generated. The system also allows curves to be used for attract or follow as well as the path noted above.

The computer system 14 also includes a storage medium, such as a disk, ROM, etc., upon which the process of the present invention is stored.

To provide the user with the immediate feedback noted above, in the invention, strokes are projected from the 2D display screen onto a geometric surface or surfaces of equal or different dimension (3D or other dimensional surfaces) in world space. For example, the user moves an input device such as a mouse or a pen so that a pointing device moves on the screen over a 2D projected representation of the surface. The multi-dimension geometry of the stroke is created by projecting the screen space locations onto the geometry. The projection from the screen can occur in a variety of projection spaces (perspective, orthographic, etc.).

As strokes are drawn and volumetric particles are produced, they are rendered onto the screen at full (or some percentage of full) resolution to provide the user with immediate feedback of the final appearance of the brush stroke. For example, as the user moves the input device's cursor across a model of a head, hair is grown along the projected stroke. The hair is shown immediately as it is created giving the user a highly accurate representation of the final appearance.

The surfaces onto which the strokes are projected need not be visible and they need not be actual surfaces in the scene. For example, the user can use stand-in geometry for an object. There may be no geometry to paint on, simply an image from some external source, in which case, a plane not visible to the user and ortho-normal to the camera can be used. Other invisible geometry can be placed in the scene to approximate the geometry of a source image, and the strokes can be painted on that geometry although the resulting particles or tubes appear to be on the image from the external source. The system also allows painting "on" a depth buffer, treating it as a surface and using the values of adjacent pixels in the depth buffer array to obtain a surface slope and normal as needed.

Figure 2:
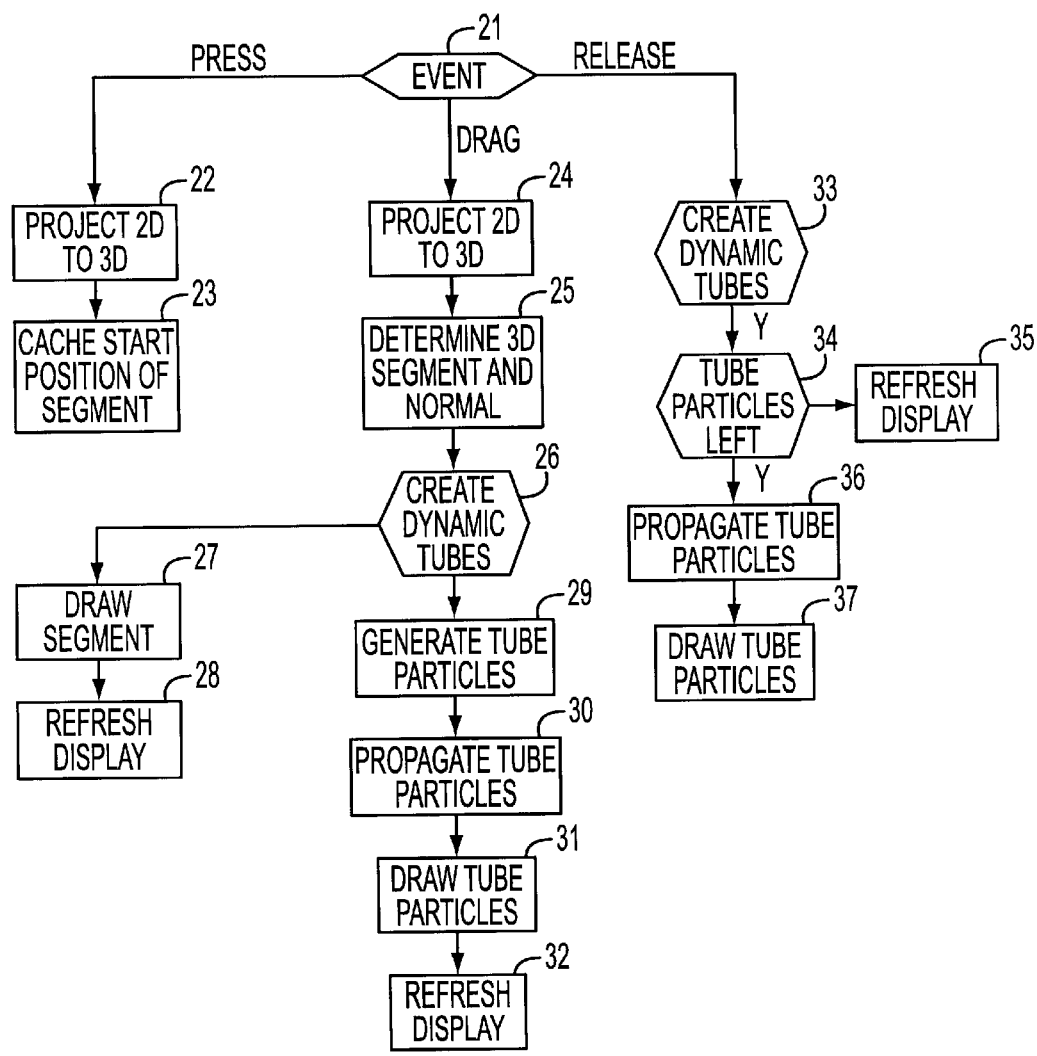
FIG. 2 depicts a flow of operations of drawing a stroke and painting particle tubes.

For the reasons noted above, because the display 12 is two dimensional (2D), the location of the points along the stroke path and the area around the path on the 3D surface need to be determined as depicted in FIG. 2. When an input event associated with the input device 16 is detected, such as a mouse input event, the system determines 21 whether the event is a select (a button press or "click"), a drag (a button hold down and input device move) or a release (a button release). When the event is a select (or button press), indicating the start of the drawing of a painted segment, the system needs to project 22 the two dimensional (2D) screen position of the cursor to the three dimensional (3D) model, object or space being painted. To do this, the 2D position of the cursor on the display and the view (the view vector) onto the 3D surface are used to conventionally map or project the cursor position into the scene. The intersection of the projection of the cursor with the 3D object is then determined 28. This operation can also determine the intersection with a specified depth in the scene, with a Z buffer defining the depth of the curve, etc. When the event is a button press the position of the cursor is then stored 23. The system then awaits another input event.

When the input event 21 is a drag, the system also conventionally projects 24 the display points of the movement of the cursor from the 2D screen space to the 3D object space. The system then determines 25 the segment location and the normal of the segment being drawn. This operation will be discussed in more detail later. The system next checks 26 to see if the paint brush has been set to draw a line segment or to paint particle tubes. When a line segment is to be drawn, the system performs a segment draw operation 27 to draw the segment, as will be discussed in more detail in FIG. 3A, and then the display is conventionally refreshed 28.

When the brush is set 26 to paint particle tubes, the system generates 29 tube particles which will be discussed in more detail later. The generated tube particles are propagated 30 (see the discussion of FIG. 3B), drawn 31 (see FIG. 3C), the display is refreshed 32 and the system awaits another input event.

When the input device selection button is released, the system determines 33 whether the brush parameters are set to dynamically continue creating particle tubes when the brush stroke stops. If not, the system waits for another input event. If so, the system enters a loop where a decision is made 34 to process the particle tubes until they have all expired when the display is refreshed 35. While particle tubes remain, they are propagated 36 (see FIG. 3B) and drawn 37 (see FIG. 3C).

Figure 3A:
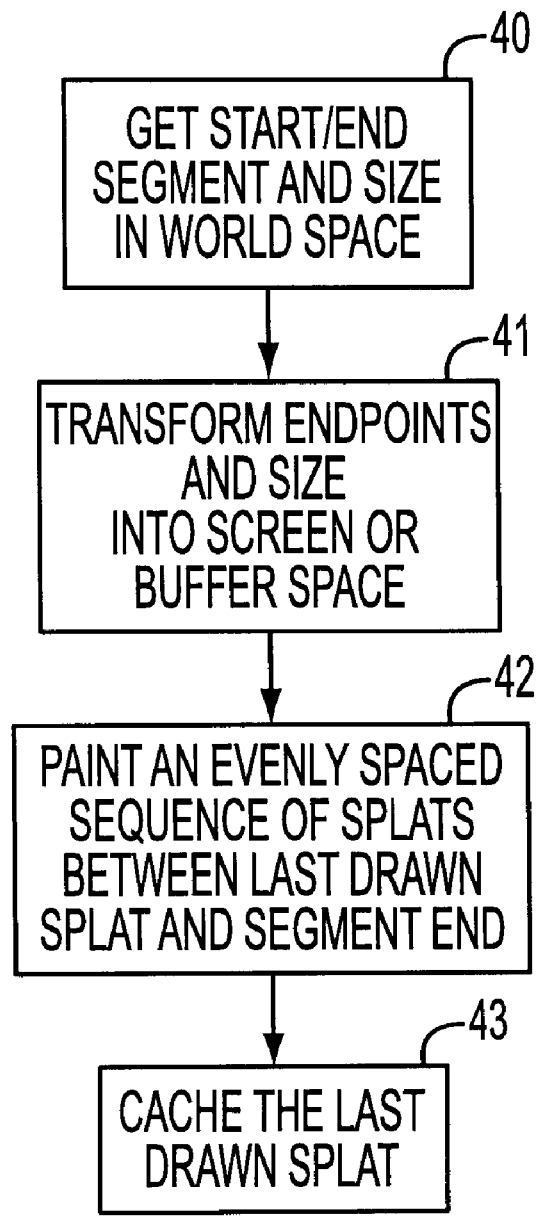
FIG. 3A shows a segment draw operation.
Figure 3B:
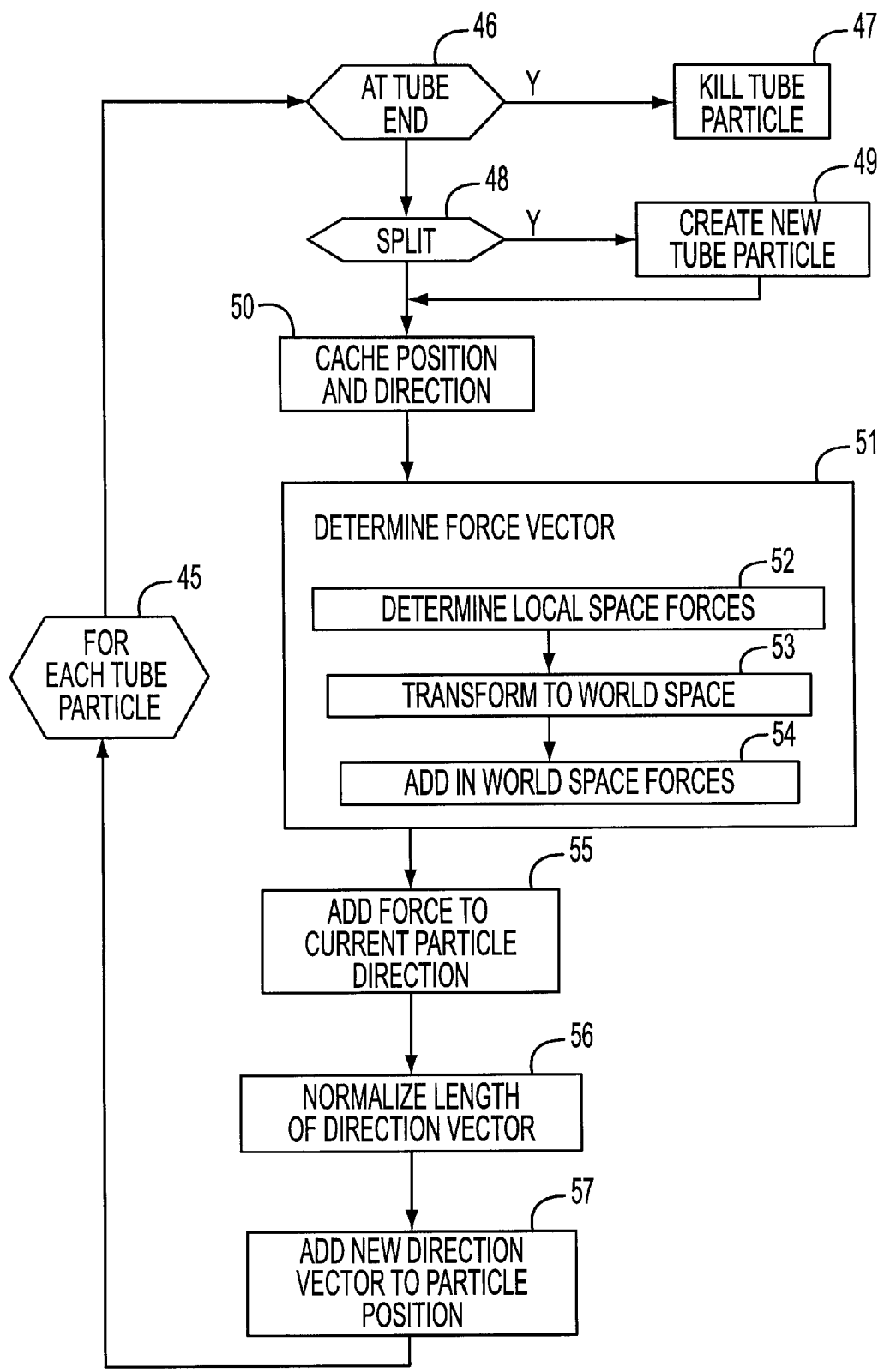
FIG. 3B depicts a particle tube propagation operation.
Figure 3C:
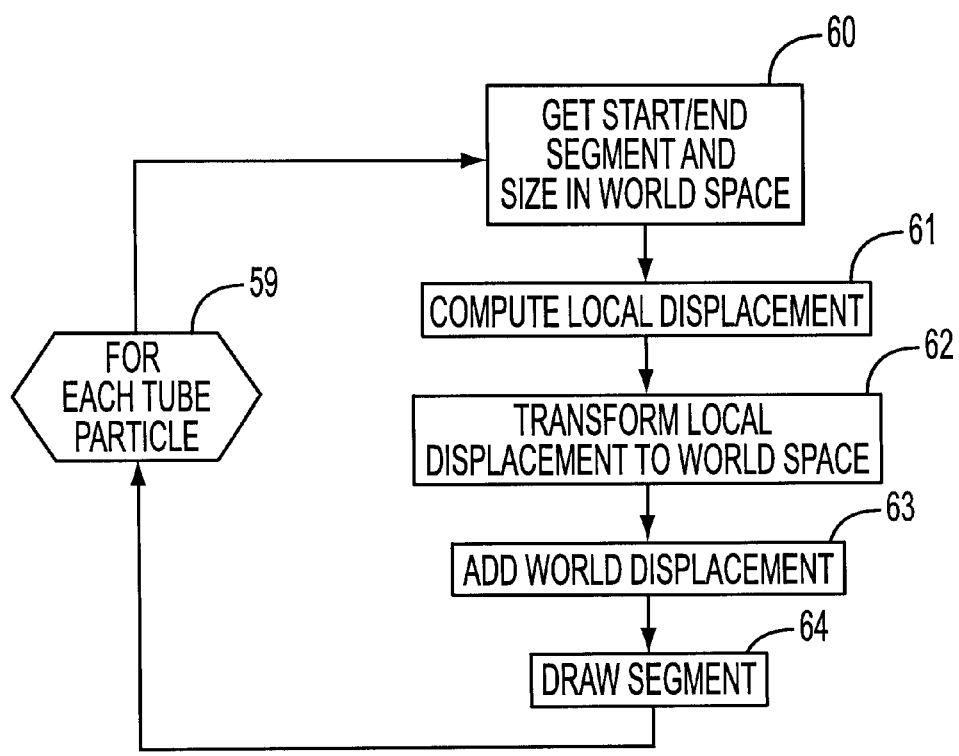
FIG. 3C illustrates a particle tube drawing operation.

As depicted in FIG. 3A, the drawing of a segment involves obtaining 40 the start and end of the segment and it's size in world space. Then, the endpoints and size are transformed 41 into screen space. Next, evenly spaced paint "splats" are painted 42 between the last drawn splat and the segment end, and then the position of the last splat is stored 43. At the end of the stamp or splat application or paint operation variables or parameters of the particle are saved or cached including the last position (noted above), the size and color of the splat, the normalization length of the line segments, the number of the most recent segment and the maximum line length in segments.

In propagating tubes (FIG. 3B), the system operates in a loop 45 governed by each particle tube that exists. The system first determines 46 whether the tube end has been reached by, for example, comparing the number of tube segments to a predetermined maximum length value. If the end has been reached, the particle is killed 47 by removing it from an array where the particles are stored and the system processes the next tube particle. When the end has not been reached, the system determines 48 whether the tube particle should be split by, for example, examining another predetermined length value. If the tube is to be split, the system creates 49 or generates one or more new particles and places them on a list or queue of particles to be processed. The position and direction of the tube particle is then stored 50. The system then determines 51 the force vector for the tube by determining 52 the local space forces, transforming 53 them into world space and adding 54 the world space forces. The forces are then used to modify 55 the particle tube direction. The length of the direction vector for tube segment is then normalized 56 and the direction vector is added to the particle position.

In drawing a tube particle, for each tube particle 59 (see FIG. 3C) the start, end and size are obtained 60. The local displacement is computed 60 and transformed 62 into world space where the displacement is added 63 to the segment. The segment is then drawn 64 as preciously discussed with respect to FIG. 3A.

The operations of FIGS. 2 and 3A–3C are also shown in the pseudo code of the Appendix included herewith.

The line drawing operation includes the painting of "splats," sometimes called paint stamps, into screen space. This involves transforming the size of the splat and the flatness or orientation of the splat into screen space. This will be discussed in more detail later herein. The points in screen space defined by a drawn line are then connected with a line where a line of splats is drawn in the system frame buffer (and interpolated if necessary). This results in a stroke of splats being applied to the representation of the object as the stroke is being made.

Because the stroke is being initially drawn in the 2D screen space and projected to the 3D geometry and can be painted on an arbitrary position in 3D space, the stroke can span multiple surfaces even if they are not geometrically continuous. For example, a stroke can move from one surface to another even though they do not touch in any location. The stroke "hangs" between the two surfaces like a clothes line between two buildings. The brush stroke and any emitted particles or tubes, are rendered across the hanging segment with conventional curve smoothing being applied, so even poorly modeled "closed" objects can be painted.

Additionally, when rendering, the strokes are transformed from the parametric space of the object to the 3D eye space of the scene at the current time. As a 3D surface deforms, the parametric space of the surface is deformed as well. To render the scene at any point in time, the surface is deformed, the strokes are evaluated in their new world space positions on the deformed surface and the paint is rendered along the strokes. Because the rendering is done is screen space, the invention helps prevent aliasing and creates resolution independence. For example, the user can zoom in on small details of the brush strokes in 3D and re-render from that location without seeing artifacts from the stroke having being created when the camera was displaying a different portion of the scene.

A path stroke or segment is defined in a 3D reference frame which is static with regard to the surface of the 3D object upon which the stroke is made. The stroke is defined by the surface normal and the direction of the stroke on the surface. In the reference frame (u,v,w), the u and v components refer to what is commonly known as the parametric coordinates on the object. The (w) component allows the stroke to not only rest on the surface (or curves on surfaces) in parametric space but to be positioned relative to the surface, either above or below it, using (w) as an offset. Using this definition allows the reference frame to deform as the underlying surface deforms.

A paint splat can have a variety of shapes depending on the type of brush being used. A typical brush has a circular shape. When a circular splat is applied to a 3D surface, depending on the point of view it can look like a circle, an oval or a line because the surface can be oriented at an angle with respect to the point of view or view vector. That is, because the surface normal may not be aligned with the view vector, a circular splat may not appear as a circle when the surface is viewed from a non-perpendicular angle. As a result, the splat must be transformed into the proper size and shape. To determine splat shape (or flatness), the dot product of the view vector and the normal to the 3D surface at the point the projection of the cursor intersects the surface is obtained. The size of the splat in screen space is determined from the distance between the screen space and the 3D surface and the field of view. If the stroke is being made with a tool that produces a special stroke, such as one that produces a flat ribbon-like stroke or a stroke that twists as it is being made, the characteristics of the particular tool must also be considered in the size and shape determinations (see FIG. 12B).

The display of the splat(s) discussed above, in the context of brush painted splats, also applies when the system of the present invention projects or generates particles or tubes from an area around a stroke path rather than painting the stroke path. Rather than the projected volume particles or particle tubes being "painted" by the user, the system paints them as they are projected.

Figure 4:
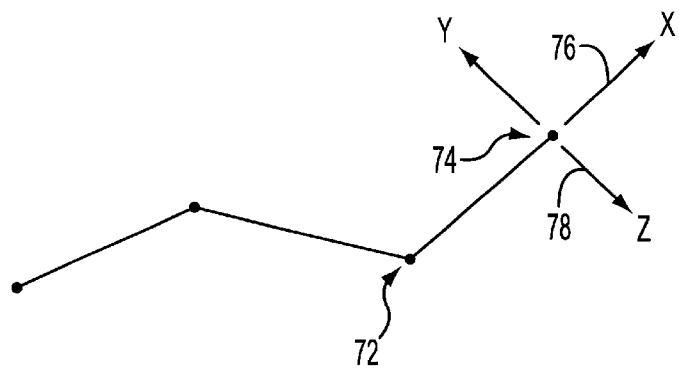
FIG. 4 shows the axes of a local coordinate system.

When the stroke path is being used to "paint" particle flows or tubes rather than to apply paint from a tool, such as a brush, the invention performs a different set of operations to determine the normal. As previously noted, the system detects an input device event which corresponds to the movement of the display pointer along the stroke path desired by the user. The system then determines the current, next or new point (see FIG. 4) on the path produced by the event. Once this current point is determined, the previous point 72 on the path and the current point 74 on the path are used to establish the direction vector 76 for this latest segment of the path. Next, the normal 78 to the 3D surface (or curve) at current or newest point is determined. The normal 78 and the direction vector 76 define two axes (x,z) of a local coordinate system or frame which is used for particle emissions. The third axis (y) of the local coordinate frame is obtained by the cross product of the vector 76 and the normal 78. As a result, the local coordinate frame (x,y,z) is defined by the direction vector (x), the cross product (y) and the normal (z).

Once the local coordinate frame is defined, the system emits particles or tubes from a predefined area or region around the path using the local coordinate frame. This "emission" is essentially the placing of the particles on a list for further processing as discussed previously. The region from which the tubes or volumetric particles are emitted is preferably a flat planar region perpendicular to the normal or from within the object surface or could be from within a worldspace volume associated with the stroke path, that is, a volume above, below, beside, around, etc. the stroke path. The size (diameter) of the region can be set by the user as desired or by the width of the brush. The particles or tubes have starting locations that are preferably randomly located within the predefined region with respect to the stroke segment.

Figure 5:
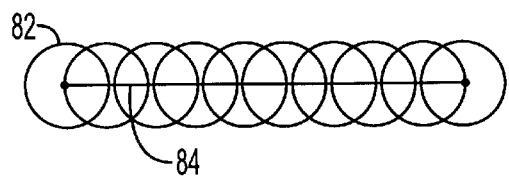
FIG. 5 shows the application of paint stamps to a line segment to create a tube.

A tube, as shown in FIG. 5, is essentially a series of paint stamps or splats 82 of a predefined shape, such as a circle, that are applied to the 3D scene along a particle projection path segment 84 with a spacing sufficiently close together to form a graphic representation of a tube. The spacing depends on the size and shape of the splat, the 3D scene resolution, etc. As noted previously, the splats are evenly spaced (in screen space) along the line segment. A splat is always painted at the start and end of a tube. However, the splats can be separated into groups of one or more along the tube with a spacing or gap between the groups allowing the appearance of beads or water drops.

Figure 6A:
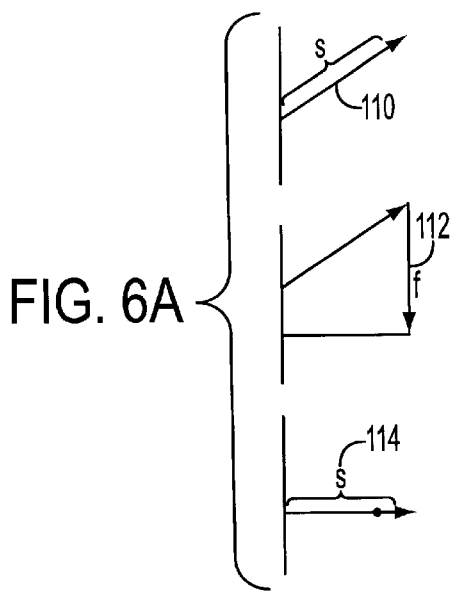
FIGS. 6A and 6B show the application of a force to a volumetric particle.
Figure 6B:
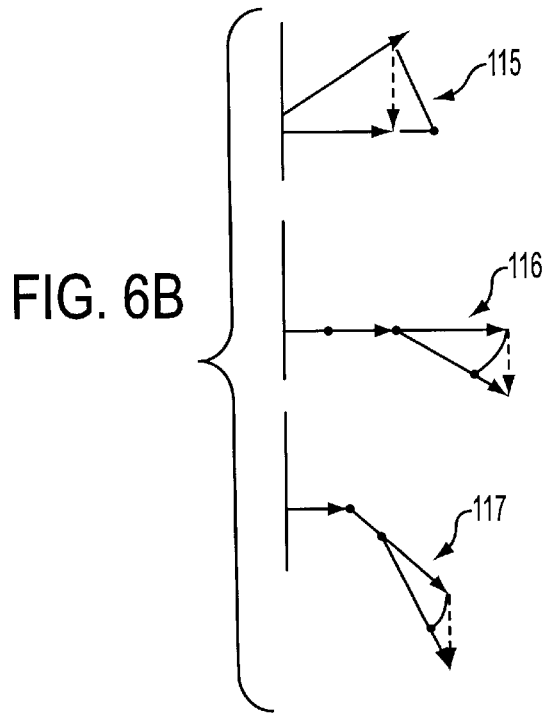

FIG. 6A shows the application of a force, such as a simple gravitational force, to a tube particle. At each tube generation step, the system first propagates or projects 110 the tube forward by a length equal to the desired tube length divided by the number of segments the tube is to have ("s"). Next, the system adds 112 a force vector ("f") to the new position. The new segment vector is now scaled 114 such that it's length is equal to the original segment length ("s"). A factor can be added to blend between the length resulting from the previous step and the segment length we can allow the tube to be stretched by forces. At this point, the system now draws the tube segment into the buffers (display and depth). Displacements may be applied to the tube during this draw operation. FIG. 6B shows this process continued for three steps 115, 116 and 117. A force that changes over time can be used to simulate turbulence.

Figure 7A:
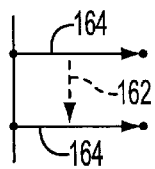
FIGS. 7A and 7B show the application of a displacement to a particle.
Figure 7B:
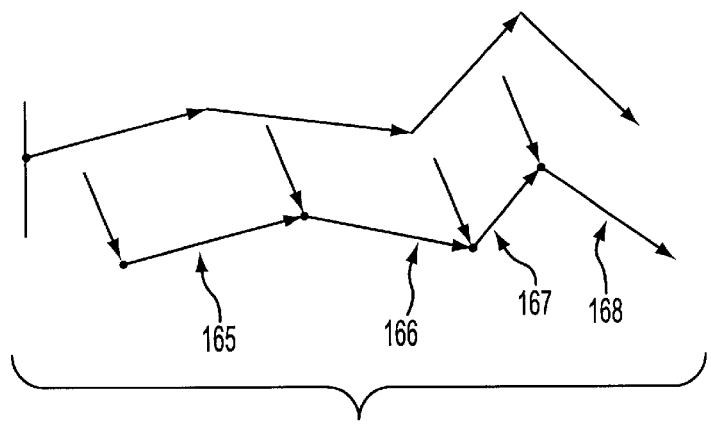

FIG. 7A depicts a displacement 162 of a single segment 164 from a first position to a second position. In a displacement, as compared to a force caused motion, all the points of the line segment as well as all segments 165, 166, 167 and 168 move as depicted in FIG. 7B. Displacements can be applied to the growth of the volumetric particles or tubes based on a procedure that causes the particles to behave in defined ways. For example, if displacements are applied to successive segments alternate in direction a wiggle pattern will be produced. If a displacement in the same direction is always applied, a volumetric particle will produce a curl pattern. Note how the general motion of the tube is not affected by a displacement such as it is by a force. For displacements, it is sometimes useful when one wishes the start of the tube to not be moved to scale the displacement based on the current position or step along the tube. Displacements are sometimes preferred when one wants the overall flow of tubes to be smooth and yet one also desires fine kinks or wiggles in the tubes. Curls are better handled by displacements, as the base tube motion provides an axis for the curl. The general flow of the curls can then be more easily specified using forces. Displacements over time can also be used to simulate turbulence.

The drawing of a line segment itself can be controlled by a procedure that allows the projected volumetric particle to be an object other than a tube, such as a flower or a tree. For example, if the size of the paint stamp is varied from small to large and back to small again the projected particle can represent a flower petal (see FIG. 12A). A twist in a flat particle tube can also be painted using paint stamp size variation (see FIG. 12B). This drawing operation includes the interpolation between size, color, etc., required when the projection direction is not aligned with the view vector. The line segment is drawn by applying splats between the last splat and the new vector end point. This operation turns a line segment with starting and end points into a tube or volumetric particle.

Figure 8:
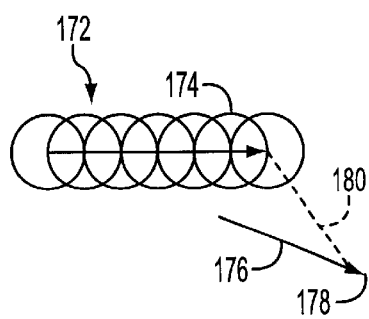
FIG. 8 depicts applying paint when a force and a displacement have been applied to a segment.

FIG. 8 depicts a first line segment 172 which has been painted and where the final splat 174 is positioned at the end of the segment. A second line segment 176 is shown where the particle was emitted with a force applied which caused the direction of the line to change. A displacement was also applied which caused the entire segment to shift. To provide continuity between the segments of the volumetric particle being drawn, the splats for the second segment are drawn between final splat 174 of the first segment 172 and the end point 178 of the projection (that is, along the dashed line 180) rather than along the displayed line segment 176.

Different effects can be produced by applying the paint according to a simulation procedure. For example, by starting the application of stamps or stopping the application of stamps at some distance from the segment endpoints, effects such as rain can be created. By periodically repainting the entire length of the volumetric particle with gaps at different positions in the tube particle the rain appears to move.

As noted previously, an input event, in addition to causing new segments to be produced for an existing volumetric or tube particle, may result in other particles being created and projected. Upon the new event, the system determines whether the number of line segments produced has reached the maximum, and if so, it stops creating new line segments in the image. If the end of the line has not been reached, a determination is made as to whether the stroke is continuing or if the system is set to complete all particle emissions even if the stroke has stopped. This is done using a "stroke-completion" parameter. If stroke-completion is not on, the system stops projecting. If stroke-completion is on, particle projection can continue with the last splat position and the direction of emission set relative to the local coordinate system and the initial direction.

As noted above, to finish the generation or projection of tubes when the stroke stops, the system can be configured to "finish" the particles or events started by the stroke by extrapolating drawing conditions at the termination of the stroke. This provides some distinct advantages. For example, when the user draws a stroke of hair on a surface, upon release of the input device, the simulation or generation continues to run until all of the particles in the system have died. This provides the user with the ability to gesture in clumps such as when the particles produced by the system need to be long, but the area on the surface from which the particles emanate needs to be small. The extrapolation at the termination of the brush stroke can be based on many variables such as the characteristics of the previously drawn strokes, the velocity of the input device at the termination point, or the impetus to move towards a specified goal location or direction. As another example of this is when the user draws a quick clump of hair, the direction and velocity of the input device's movement (relative to the surface) at the termination of the stroke give the hair a direction and influences the length as the simulation grows the hair until of the particles have died because the maximum segment length has been reached. The completion of a stroke can be used to automatically fill a surface or volume with a desired set of particle tubes or volumetric particles. For example, the user selects an object representing a ground plane, and creates a stroke from which trees (tubes shaped like trees) sprout. Upon completion of the stroke, the plane is filled with identical, similar, or even varied brush strokes which also grow trees (or variants of the trees).

The dynamic simulation of the elements (particles tubes) during the flow of the stroke is invoked only while the user is moving the input device to create new projected particles (stroke completion off) and in some cases at the end of a stroke (stroke-completion on). The dynamic generator, because it is input driven (see FIG. 2) does not continue to run when the user pauses in mid-stroke. For example, when a user is using a mouse to paint grass on a model landscape, and the mouse reaches the edge of the desk or mouse pad and the user needs to reposition the mouse before continuing the stroke, the invention does not continue to produce grass while the mouse is picked-up and being repositioned (without moving the track ball of the mouse). As another example, when the user pauses to evaluate the look of the stroke so far or to determine the best direction in which to paint painting stops. During the pause, the user does not get a saturation mark in the scene as would occur with real media such as India ink and paper or spray paint and concrete (or indeed many digital paint systems).

The projected or generated elements such as the volumetric particles or tubes can flow along the stroke. For example, particles are generated along the path of the stroke. Either on the stroke or in an area around the stroke. The particles travel in the reference frame defined by the stroke and the object surface(s). This can constrain the particle to the surface of the object, or can allow the particles to flow above and/or below the surface.

Figure 9:
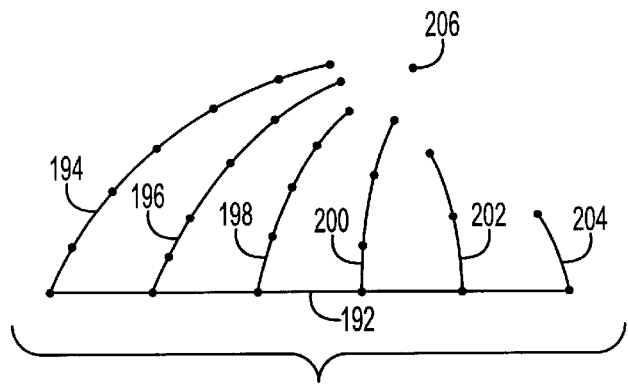
FIG. 9 illustrates an attractive force.

Flow effects can also be modulated based on time, location or physical (i.e. forces) properties. For example, animated brushes are possible for effects like flickering flames where any parameter of the brush may be animated over time so that successive images rendered with a changing time parameter will produce an animation. FIG. 9 shows a stroke 192 emitting tubes 194–204 that are attracted to a point 206 by an attractive force.

Because the particles are affected by forces the particles are "aware" of their proximity to various reference points, such as the stroke, the local surface and the center of the brush stamp or splat. This allows particles to be statistically shaded since we expect particles near the center of the brush stamp to have more particles shadowing them.

Because the stroke itself can be used as a force (the current stroke position being the source of the force and the distance to the particle affecting force strength), the user's drawing stroke can modify the flow of elements along it allowing the user to control the shape of the flow. For example, a faster moving brush can cause the particles to move faster, spread out, or become larger. Moving the brush in a consistent direction and at a consistent speed will produce orderly particle effects, while moving the brush randomly will produce random particle effects. Because the stroke can be a force, the stroke can modify the flow of elements over time, not just at the moment of element creation. For example, once the particle tube is created, the continuing motion of the user's input device influences the direction of the particles movement. Swirls and wiggles in the flow (and hence the volumetric particle's movement) can be effected in this manner whereas it is difficult to get this type of control using other methods of particle generation.

Figure 10A:
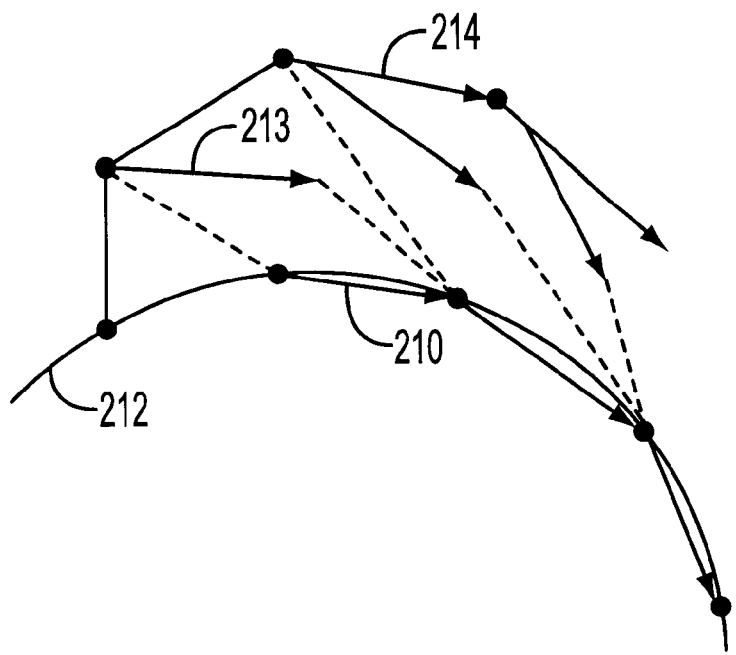
FIGS. 10A and 10B illustrates the stroke being an attractive force.
Figure 10B:
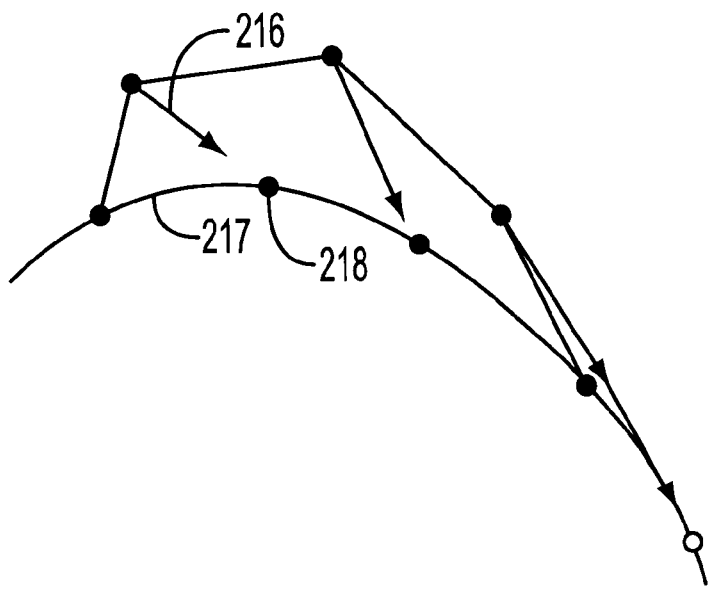

FIG. 10A shows application of a follow force and FIG. 10B an attraction force. In the follow force the current vector 210 along the stroke path 212 is used as a force vector 213, causing the resulting tube 214 to flow along with the stroke. The attractive force uses the vector 216 defined by the current tube position 217 and the current stroke position 218 instead. This results in the tube being pulled toward the stroke. The particle generating a long tube might oscillate around the stroke like the path of an orbiting planet in such a situation.

Figure 11A:
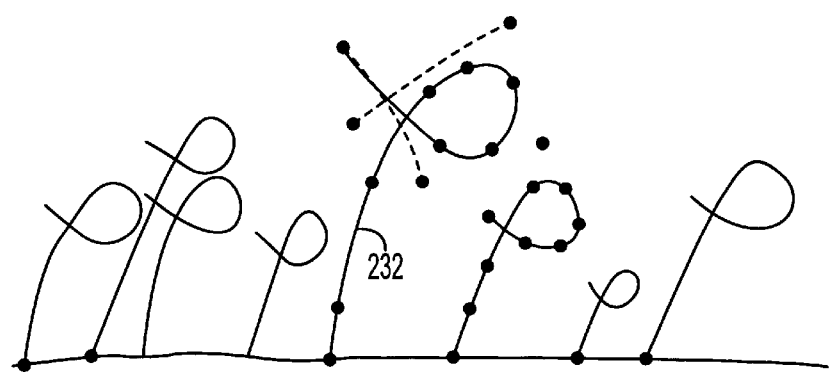
FIGS. 11A and 11B show follow forces being applied.
Figure 11B:
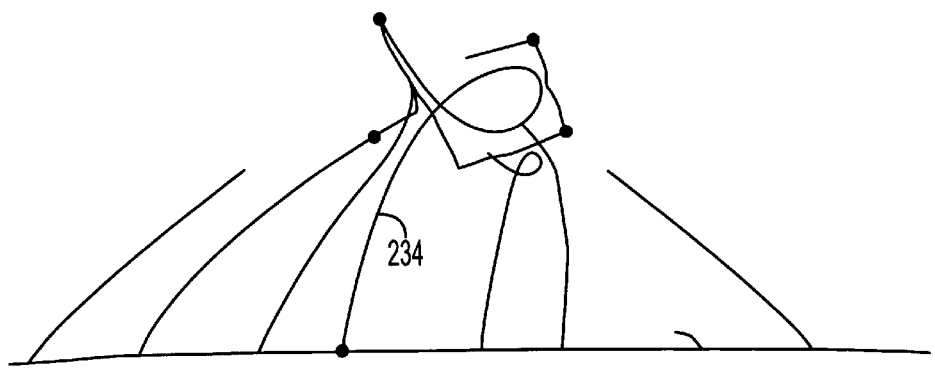

Control curves use the same attractive and follow force method described above, but are generally added to the stroke after it has been created. FIG. 11A shows a control curve 232 used as a follow force and FIG. 11B shows a control curve 234 being used as an attractive force. It is often useful to apply a mixture of these two forces, as well as to combine the control curve forces with stroke path forces. The combination of stroke path and control curve creates a good frame of reference for the definition of effects like long hair. The stroke path gives the general flow and direction over a surface, as well as defining where the tubes emit from. It can be used as a local sense of surface, to simulate surface collision and also for shading purposes. The control curves provide extra control over the direction and shape of the resulting tubes that is sometimes needed when they are very long. To determine the vectors to be used in applying the curve force, the curve is sampled at intervals based on the number of segments in a tube.

Thus, if a tube has 10 segments and we are currently at the 3rd simulation step, we evaluate the curve at a point 3/10ths of a way along it and 2/10ths of a way along it. These two curve points define a vector that is used for the follow force. The vector from the current tube particle position to the curve at 3/10ths would be used for the attractive force. The length of this attractive vector can also be used to define a falloff of influence with distance for the curve. A falloff with distance is especially useful when using an array of control curves, so that each curve affects the tubes more that are near it.

Input pressure can be useful for controlling various parameters during the brush stroke. The most common usage of this is to vary the brush size and opacity. However with the addition of a dynamic particle tube system such as in the present invention one can use pressure to control parameters such as: the number of tubes created per simulation step, the number of branches, flowers or leaves, the intensity of turbulence forces, the width and length of tubes, the angle of tube emission, etc. Thus, a system can provide brushes where when you press lightly you get shrubs and when you press hard you get trees. A whole variegated forest can be defined with a measure of control in a single brush stroke. A creeping vine brush might cause the vine to sprout flowers when one presses harder. If one has a tablet that measures stroke elevation off of the tablet and pen rotation, one could map the elevation input to elevation of the 3D stroke off of the paint surface along the surface normal, and pen rotation to the angle of tube emission. Note that pressure or any other input device events need to be cached on the stroke object to be persistent, or viewable from different vantage points.

Because a stroke defines a surface or local coordinate frame, the invention allows the local coordinate frame to be used for forces on the volumetric particles as previously discussed. The local frame can also be used for shading of particles such as by providing a shadow from the center of the brush stroke, a particle birth shadow from the splat center, a shadow from a local distance to the surface, a shadow from a local distance to the brush-stroke, etc. The local frame also allows the creation of splat shadows using an assumption of local flatness of the parent surface to allow an increase in splat size and transparency with distance from the shadow caster for soft lighting and good handling of oblique shadows.

The emitted volumetric particles are defined in world space, but are transformed relative to this local coordinate frame and thus will follow surface deformations. Dynamics flow changes such as spiral and wiggle can be applied relative to the local frame. Using the local frame particle elevation and azimuth, controls relative to stroke direction and surface normal can be provided to the user to allow custom control of particle emission.

The invention has been described with strokes and particles being traversed in a user specified order or a machine generated order when rendering. The default order is the order the user painted the strokes. It is possible for the user to modify this drawing order at any time.

Figure 12A:
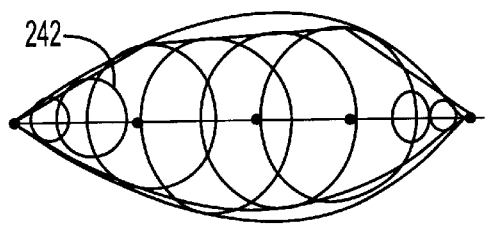
FIGS. 12A and 12B show a flower petal and grass blade produced via volumetric particle projection.
Figure 12B:
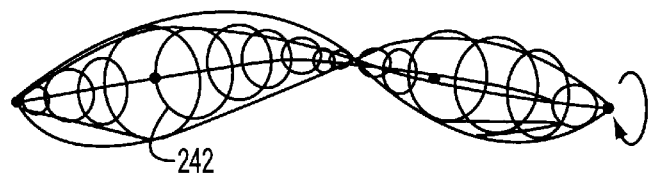

The present invention has been described as projecting volumetric particles or particle tubes as a brush stroke is made. What is projected is not limited to tubes and particles. Because the projection is the application of paint splats or stamps along a projection direction in line segments driven by sampling of input events, the paint can be used to draw trees, flowers, grass, rain, fire, human hair, etc. For example, a tree can be grown by emitting or branching one or more new volumetric particles from a line segment based on a procedure that emits particles when a predetermined number of line segments of an original particle path have been drawn or based on a some other emission control such as a random number generator. This same branching can be used to create twigs, leaves or flowers where a simple flower is the emission of a relatively large number of petal shaped tubes in different directions from approximately the same spot. FIGS. 12A and 12B depicts paint splats or stamps 242 being applied along a volumetric particle segment projection where the stamps change in size to represent a flower petal (12A) or a twisting blade of grass (12B).

The present invention has been described with each initial particle emission point emitting a single volumetric particle. It is possible for more than one particle to be emitted from a single initial point. Each time an input event occurs and a volumetric particle segment is to be generated, the system can generate more than one segment. The length of the tubes or volumetric particles emitted can vary over time or based on the segment number in the particle path. Each volumetric particle is emitted or drawn as a tube and the shape of the tube, the width of the tube as well as the flatness of the tube can be changed. The length of the volumetric particles in segments need not all be the same and the length can be controlled by a procedure or randomly. The size of the area from which the particles or tubes are emitted can also be changed by the user.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

```
Event( event Type )
{
        if( eventType == PRESS )
        {
            // project stroke onto Geometry
            // to get strokeSegment start 3D
            // position
        }
        if( eventType == DRAG )
        {
            // project stroke onto Geometry
            // set strokeSegment start and end
            // to previous and current 3D
            // intersect positions
            // get the surface normal at the
            // intersect point
            if( createDynamicTubes )
            {
                // paint dynamic 3D Tubes
                generateTubeParticles( );
                propagateTubeParticles( );
                drawTubeParticles( );
            }
            else
            {
                // paint a single 3D Tube
                drawTubeSegment(segmentPosition,
                brushSize, color,
                last2DStampPostion);
            }
        }
        if( eventType == RELEASE )
        {
            if( createDynamicTubes and stroke
```

APPENDIX
-continued

```
            completion is on )
        {
            // we propagate the dynamic tube
            // particles until all the
            // tubes are fully drawn
            while ( there are some
            tubeParticles )
            {
                propagateTubeParticles( );
                paintTubeParticles( );
            }
        }
    }
}
generateTubeParticles ( segment, normal,
    userDefinedAttributes,
tubeParticleArray )
{
        newTubes = rand( ) * tubesPerSegment;
        For each new Tube{
            create a new tubeParticle structure
            set the tubeParticle position to a
            random point along the segment;
            offset this position within the
            normal plane by rand ( ) * brushWidth;
            define the following based on user
            controls and random values:
            -start direction, tube width, color,
            segmentCount, and segment length
        }
}
propagateTubeParticles( segment, normal,
    userDefinedAttributes,
tubeParticleArray )
{
        for each tubeParticle{
            if( segmentCount == 0 )
            {
                Kill tubeParticle;
                continue;
            }
            else
            {
                segmentCount = segmentCount – 1;
            }
            if( split )
            {
                //Create new Tubes based on
                // current tube position and
                // direction;
            }
            // Cache the tube position and
            // direction,
            // as well as any dynamically
            // changing tube attributes;
            // determine the path and control
            // curve Follow forces
            forceVector = (segment.Start –
                    segment.End) *
                    pathFollowIntensity;
            // add in the path and control curve
            // Attract forces
            forceVector += (segment.End –
            tubePosition) * pathAttract;
            curveForceVector.set( 0,0,0 );
            for each controlCurve{
                //Find a worldspace segment on
                //the control curve that is at
                //the
                //corresponding along the curve
                //that the tubeParticle is
                //along
                //the tube (the curve param
                //values could be defined using
                //the
                //tubeParticle
                //segmentCount/maxSegments and
```

APPENDIX

```
            //(segmentCount +
            // 1) /maxSegments) .
            // determine the way the control
            //intensity changes with
            //distance
            // to the curve
            distanceDecay =
            someDecayFunction(length
                (tubePosition -
                segment.End));
            // determine the path and
            //control curve Follow forces
            curveForceVector +=
                (curveSegment.Start -
                curveSegment.End) *
                curveFollowIntensity *
                distanceDecay;
            // add in the path and control
            //curve Attract forces
            curveForceVector +=
                (curveSegment.End -
                tubePosition) *
                    curveAttract *
                    distanceDecay;
            }
            forceVector += curveForceVector;
            //Determine a new direction vector f
            //or the
            tubeDirection = tubeDirection +
                forceVector;
            //normalize the length so that tubes
            //don't stretch
            tubeDirection = segmentLength *
                tubeDirection /
                length (tubeDirection)
            // move the particle forward along
            //the new direction
            tubePosition += tubeDirection;
        }
}
paintTubeParticles( segment, normal,
    userDefinedAttributes, tubeParticleArray
)
{
            for each tubeParticle{
                // displacementVector = desired
                //displacement amount and direction
                //of displacement effect
                //For displacement effects such as
                //wiggle on hair, it is
                //useful to define this displacement
                //relative to the current
                //segment vector and normal, then
                //transform it into worldspace
                //before adding to the tubePosition.
                //In this manner the wiggle
                // will generally follow the surface
                //contours, and will also
                //animate with
                // the surface.
                offsetPosition = tubePosition +
                displacementVector;
                drawTubeSegment (offsetPosition ,
                tubeSize, tubeColor,
                    last2DStampPosition);
            }
}
drawTubeSegment( position, size, color,
                lastStamp2DPosition )
{
        //Transform position and size from
        //worldspace into 2D bitmap(or
        //screen) space
        //last splat drawn by this tubeParticle
        //Cache the 2Dposition of the last splat
        //drawn and any dynamic
        //attributes associated
        //with it, such as color and width, on
        //the tubeParticle.
}
```

What is claimed is:

1. A graphics painting system, comprising:
   an input device allowing a user to interactively draw a volumetric particle flow path, the path defining a constantly changing frame of reference;
   a display; and
   a computer generating a plurality of volumetric particles, the computer controlling a flow of each volumetric particle along the path by automatically emitting the volumetric particles, using the constantly changing frame of reference, from a region on and around the path as the user draws the path, and displaying the volumetric particles in real time as the volumetric particles are generated.

2. A system as recited in claim 1, wherein a flow of the particle is controlled by the user as flow control input.

3. A system as recited in claim 2, wherein the flow control input corresponds to the stroke.

4. A system as recited in claim 1, wherein particles are generated from a region around the stroke.

5. A system as recited in claim 1, wherein the user can set an initial direction of the particle, the initial direction defined according to a coordinate space of a current stroke segment.

6. A graphics painting system, comprising:
   an input device allowing a user to interactively draw a volumetric particle flow path, the path defining a constantly changing frame of reference;
   a display; and
   a computer generating a plurality of volumetric particles, the computer controlling a flow of each volumetric particle along the path by automatically emitting the volumetric particles, using the constantly changing frame of reference, from a region on and around the path as the user draws the path, and displaying the volumetric particles in real time as the volumetric particles are generated, wherein, as the user draws the path, new volumetric particles are generated and existing volumetric particles grow additional segments and split, emitting new volumetric particles.

7. A system as recited in claim 6, wherein segments are generated responsive to stroke input events.

8. A system as recited in claim 7, wherein segments are generated after input events stop when the user specifies that a stroke is to be completed.

9. A system as recited in claim 6, wherein the particle is subject to force and displacement changing an end point of a one of the segments.

10. A graphics painting system, comprising:
    an input device allowing a user to interactively draw a volumetric particle flow path, the path defining a constantly changing frame of reference;
    a display; and
    a computer generating a plurality of volumetric particles, the computer controlling a flow of each volumetric particle along the path by automatically emitting the volumetric particles, using the constantly changing frame of reference, from a region on and around the path as the user draws the path, and displaying the volumetric particles in real time as the volumetric particles are generated, wherein the flow of the volumetric particles is controlled by a control curve, the control curve being added to the path after the user draws the path.

11. A graphics painting system, comprising:

an input device allowing a user to interactively draw a volumetric particle flow path, the path defining a constantly changing frame of reference;

a display; and a computer generating a plurality of volumetric particles, the computer controlling a flow of each volumetric particle along the path by automatically emitting the volumetric particles, using the constantly changing frame of reference, from a region on and around the path as the user draws the path, and displaying the volumetric particles in real time as the volumetric particles are generated, wherein the volumetric particles are generated with gaps therein.

12. A graphics painting system, comprising:

an input device allowing a user to interactively draw a volumetric particle flow path, the path defining a constantly changing frame of reference;

a display; and a computer generating a plurality of volumetric particles, the computer controlling a flow of each volumetric particle along the path by automatically emitting the volumetric particles, using the constantly changing frame of reference, from a region on and around the path as the user draws the path, and displaying the volumetric particles in real time as the volumetric particles are generated, wherein input device pressure controls volumetric particle generation.

13. A painting process, comprising:

inputting a curve having a curve path by a user, the curve path defining a constantly changing frame of reference; and generating volumetric particles interactively and controlling a flow of each volumetric particle along the curve path as the curve is being made by automatically emitting the volumetric particles, using the constantly changing frame of reference, from a region on and around the curve as the user draws the curve, and displaying the volumetric particles in real time as the volumetric particles are generated.

14. A process as recited in claim 13, further comprising controlling particle flow responsive to the stroke.

15. A computer readable storage medium storing a process controlling a computer allowing interactive painting of volumetric particles responsive to a curve drawn by a user, the process comprising:

inputting a curve having a curve path by a user, the curve path defining a constantly changing frame of reference; and generating volumetric particles and controlling a flow of each volumetric particle along the curve path as the curve is being made by automatically emitting the volumetric particles, using the constantly changing frame of reference, from a region on and around the curve as the user draws the curve, and displaying the volumetric particles in real time as the volumetric particles are generated.

16. A graphics painting system, comprising:

an input device allowing a user to a paint brush stroke;

a display; and a computer interactively generating and displaying volumetric particles responsive to the stroke as the stroke is being made with a flow of the volumetric particles controlled by the user as the user inputs a flow control input corresponding to the stroke, the volumetric particles being randomly generated from a volume region around the stroke, the user setting an initial direction of the volumetric particles, the volumetric particles being generated in segments as the user makes the stroke responsive to stroke input events, volumetric particle segments being generated for a predetermined length of the volumetric particles after input events stop when the user specifies that a stroke is to be completed, and the volumetric particles being subject to force and displacement changing an end point of a one of the segments.

17. A painting process, comprising:

inputting, interactively, a brush stroke made by a user, the brush stroke defining a constantly changing frame of reference; and generating volumetric particles and controlling a flow of each volumetric particle along a stroke path as the stroke is being made by automatically emitting the volumetric particles, using the constantly changing frame of reference, from a region on and around the curve as the user draws the curve, and displaying the volumetric particles in real time as the volumetric particles are generated, wherein, as the user draws the path, new volumetric particles are generated and existing volumetric particles grow additional segments and split, emitting new volumetric particles.

18. A painting process, comprising:

inputting, interactively, a brush stroke made by a user, the brush stroke defining a constantly changing frame of reference; and generating volumetric particles and controlling a flow of each volumetric particle along a stroke path as the stroke is being made by automatically emitting the volumetric particles, using the constantly changing frame of reference, from a region on and around the curve as the user draws the curve, and displaying the volumetric particles in real time as the volumetric particles are generated, wherein the flow of the volumetric particles is controlled by a control curve, the control curve being added to the path after the user draws the path.

19. A painting process, comprising:

inputting, interactively, a brush stroke made by a user, the brush stroke defining a constantly changing frame of reference; and generating volumetric particles and controlling a flow of each volumetric particle along a stroke path as the stroke is being made by automatically emitting the volumetric particles, using the constantly changing frame of reference, from a region on and around the curve as the user draws the curve, and displaying the volumetric particles in real time as the volumetric particles are generated, wherein the volumetric particles are generated with gaps therein.

20. A painting process, comprising:

inputting, interactively, a brush stroke made by a user, the brush stroke defining a constantly changing frame of reference; and generating volumetric particles and controlling a flow of each volumetric particle along a stroke path as the stroke is being made by automatically emitting the volumetric particles, using the constantly changing frame of reference, from a region on and around the curve as the user draws the curve, and displaying the volumetric particles in real time as the volumetric particles are generated, wherein input device pressure controls volumetric particle generation.

21. A graphics painting method, comprising:

inputting a brush stroke made by a user; and generating and displaying, interactively, volumetric particles responsive to the stroke as the stroke is being made, with a flow of the volumetric particles controlled by the user as the user inputs a flow control input corresponding to the stroke, the volumetric particles being randomly generated from a volume region around the stroke, the user setting an initial direction of the volumetric particles, the volumetric particles being generated in segments as the user makes the stroke responsive to stroke input events, volumetric particle segments being generated for a predetermined length of the volumetric particles after input events stop when the user specifies that a stroke is to be completed, and the volumetric particles being subject to force and displacement changing an end point of a one of the segments.

22. A painting process, comprising:

drawing a curve interactively by a user moving a computer input device; and generating and displaying in real time volumetric particles on and around the curve as the user draws the curve, and the curve controlling direction and speed of the volumetric particles.

* * * * *